Jan. 30, 1934.  W. L. MARDEN  1,945,056
METER GEAR HOUSING
Filed May 20, 1932
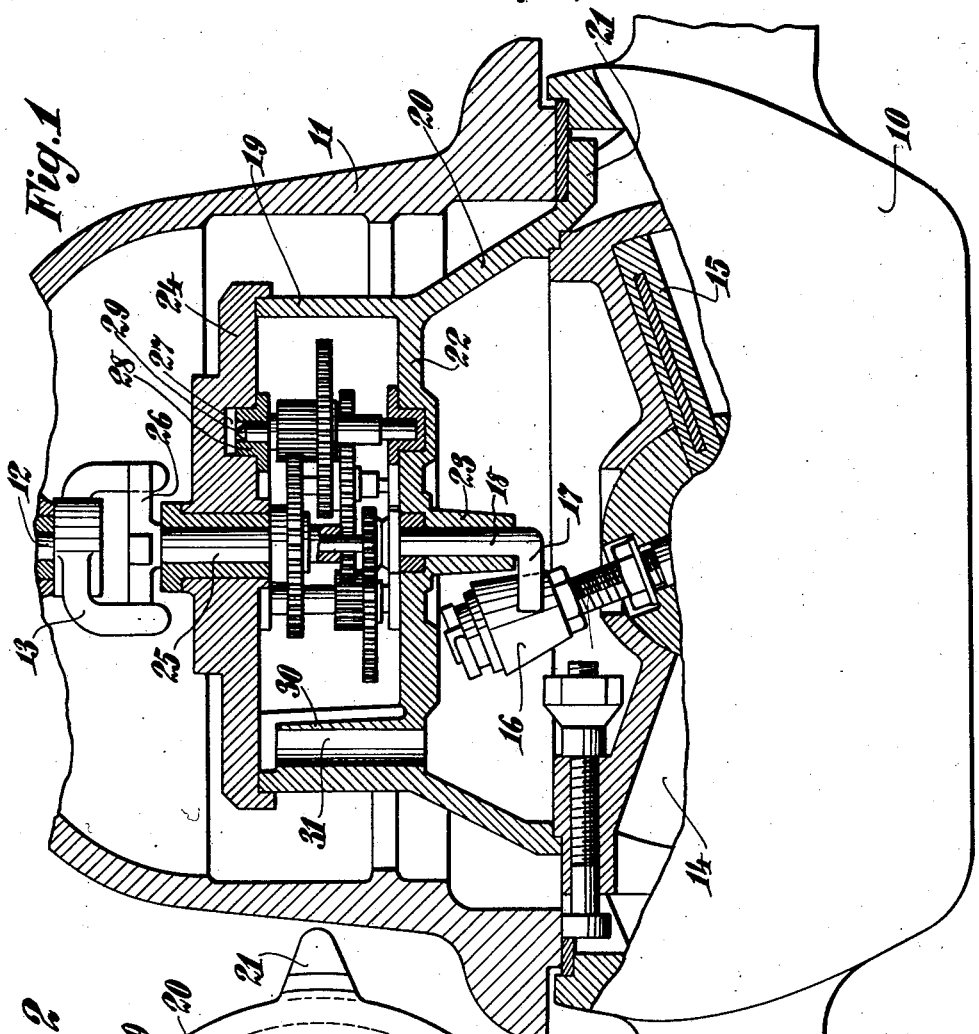
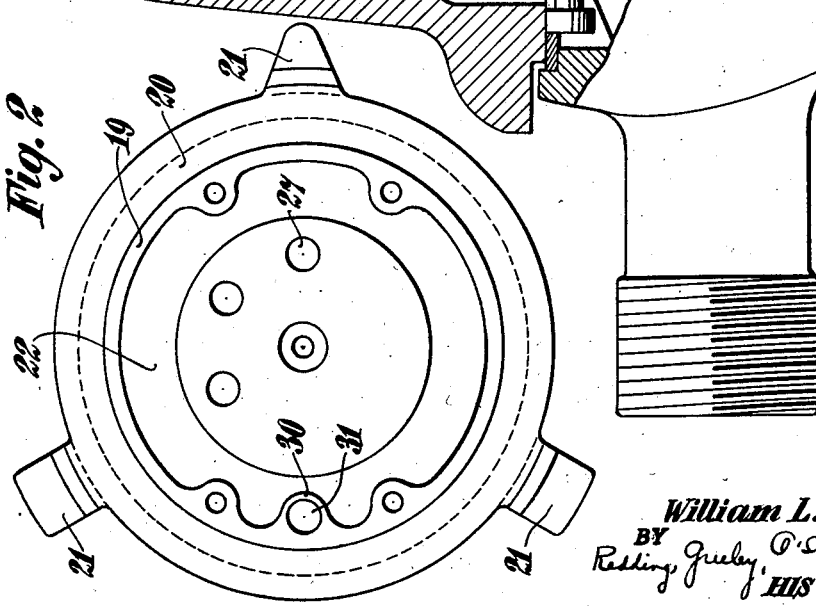
INVENTOR
William L. Marden,
BY Redding, Greeley, O'Shea & Campbell
HIS ATTORNEYS Patented Jan. 30, 1934

1,945,056

UNITED STATES PATENT OFFICE 1,945,056

METER GEAR HOUSING

William L. Marden, Elmhurst, N. Y., assignor to Neptune Meter Company, New York, N. Y., a corporation of New Jersey Application May 20, 1932. Serial No. 612,528

1 Claim. (Cl. 73—98)

The present invention relates to fluid meters and embodies, more specifically, an improved meter construction wherein the intermediate gear train is enclosed in a special form of housing to permit the gear train to work in oil or other suitable lubricating medium.

Meter constructions wherein the gear train is adapted to work in oil are common and broadly do not constitute any part of the present invention. These prior constructions also include housings for intermediate gear trains which are adapted to be mounted as a unit in a meter and receive a suitable lubricating fluid by means of which the intermediate gear train is continuously lubricated. Under certain conditions, these existing constructions do not function thoroughly. The prior constructions, embodying a housing wherein the gear train or registering mechanism is maintained in a fluid which is kept separate from the liquid being measured, frequently function unsatisfactorily and, where vents or other ducts are provided communicating with the interior of the housing for the gear train, the oil or other medium is sometimes blown out of the gear case when the pressure on the meter is relieved.

The present invention seeks to provide a meter construction wherein an auxiliary gear train is mounted in a housing which contains a liquid which may be of the type being measured, the housing being of such construction that the liquid retained therein does not escape during use.

The invention further contemplates the provision of a meter construction wherein the fluid retained within the auxiliary gear transmission housing cannot escape, regardless of the position of the housing. In this connection, the meter is of such character that any air trapped in the gear chamber escapes therefrom upon a drop in pressure instead of blowing the fluid from the chamber.

The invention further contemplates the provision of a meter construction having an auxiliary gear chamber in which a fluid is retained, the chamber being of such character that the fluid therein is not washed out by the fluid being measured.

Further objects, not specifically enumerated above, will be apparent as the invention is described in greater detail in connection with the accompanying drawing, wherein:

Figure 1 is a view in side elevation, partly broken away and in section on a plane passing through the axis, of a meter constructed in accordance with the present invention.

Figure 2 is a plan view of an auxiliary gear housing constructed in accordance with the present invention, the top being removed in the interest of clearness.

With reference to the construction shown in Figures 1 and 2, a meter casing is illustrated at 10 having a dome-shaped housing 11 upon which a suitable register mechanism is mounted and driven by means of a shaft 12. Shaft 12 is provided with a forked extremity 13 to receive power from a transmission mechanism described hereinafter.

The meter casing 10 forms a measuring chamber 14 in which is a measuring disc 15 which is of standard construction and constitutes no part of the present invention. Disc 15 actuates an arm 16 which is adapted to engage an offset arm 17, formed upon a shaft 18.

In the housing 11, and secured between the same and chamber 14, is a housing 19 upon which a skirt 20 is formed, the skirt being provided with a flange 21 which is secured between the housing 11 and measuring chamber 14. Housing 19 is formed with a bottom 22 having a bearing 23 in which shaft 18 is journaled. A removable top 24 is adapted to be secured to housing 19 and forms a support for the upper ends of the shafts constituting the intermediate gear train for fluid meters. This gear train is illustrated in Figure 1 and receives power from shaft 18, transmitting the same to a shaft 25 which is journaled in the top 24. Shaft 25 is formed with driving arms 26 which engage the forked extension 13 of shaft 12 and thus impart the rotation of shaft 18 to the register mechanism. The top 24 and bottom 22 of the housing 19 are formed with suitable recesses 27 within which bushings 28 are mounted to receive the ends of the shafts upon which the gears of the train are mounted. These shaft ends are preferably pointed, as indicated at 29, to facilitate the assembly of these elements.

In the cylindrical wall of housing 19, a boss 30 is formed, the boss extending from adjacent the top of the housing through the bottom thereof. Within this boss a vent or duct 31 is formed, the duct affording communication between the interior of the housing and the region below the skirt 20.

In assembling the elements of the meter, a suitable fluid is introduced into the housing 19 and the top thereof secured in position and the assembly completed. Any air which has been trapped within the housing 19 will escape through the vent 31 upon a drop in pressure in the meter and the liquid contents of the housing will thus not escape therefrom. Whether the meter is positioned upright or upsidedown, the contents of the housing will not escape and thus the intermediate gear train always runs in a suitable lubricating fluid. These two positions of the meter are the ones which it normally assumes. The meter is stored in an upsidedown position and, of course, used in an upright position. A rapid movement of the meter between these two positions prevents the escape of any appreciable quantity of oil from the intermediate gear chamber.

As the gear train housing is completely enclosed, equalization of the internal and external pressures is necessary and the vent 31 accomplishes this result. The liquid within the housing will not be blown out upon a sudden decrease in pressure since the vent hole will cause any trapped air within the housing to escape first.

While the invention has been described with specific reference to the accompanying drawing, it is not to be limited, save as defined in the appended claim.

I claim as my invention:

In a meter having a measuring chamber and a cover, a housing for the intermediate gear train of the meter, a skirt on the housing adapted to be secured between the measuring chamber and cover of the meter, and means forming a vent communicating with the upper portion of the interior of the housing and extending through the bottom of the housing to communicate with the region under the skirt.

WILLIAM L. MARDEN.